(No Model.) 3 Sheets—Sheet 3.
F. G. & A. C. SARGENT.
WOOL WASHING MACHINE.

No. 498,308. Patented May 30, 1893.

Witnesses
Wm. S. Brown
N. P. Ockington.

Inventors:
Frederick G. Sargent
Allan C. Sargent
By David Hall Rice
Attorney

UNITED STATES PATENT OFFICE.

FREDERICK G. SARGENT AND ALLAN C. SARGENT, OF GRANITEVILLE, MASSACHUSETTS.

WOOL-WASHING MACHINE.

SPECIFICATION forming part of Letters Patent No. 498,308, dated May 30, 1893.

Application filed April 14, 1892. Serial No. 429,206. (No model.)

*To all whom it may concern:*

Be it known that we, FREDERICK G. SARGENT and ALLAN C. SARGENT, of Graniteville, in the county of Middlesex and State of Massachusetts, have invented a new and useful Improvement in Wool-Washing Machines, of which the following is a specification.

Our invention relates to wool washing machines, and it consists in certain improved constructions and combinations of the several parts of the same, substantially as hereinafter described and claimed.

Figure 1:
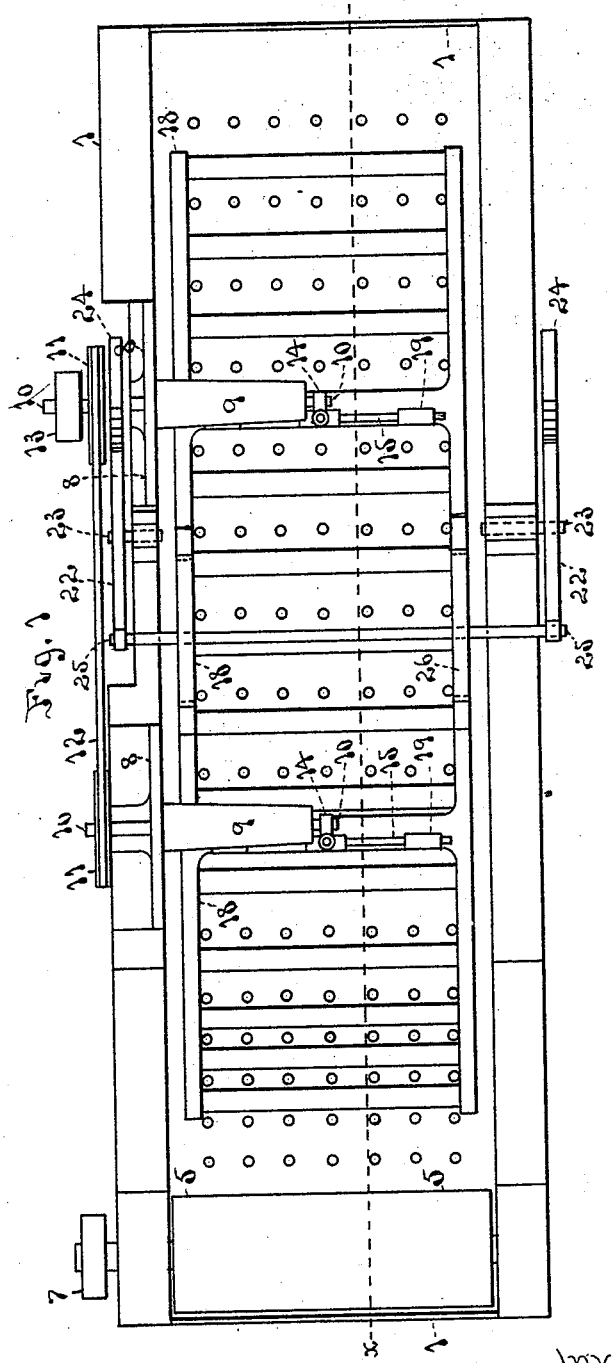
Figure 2:
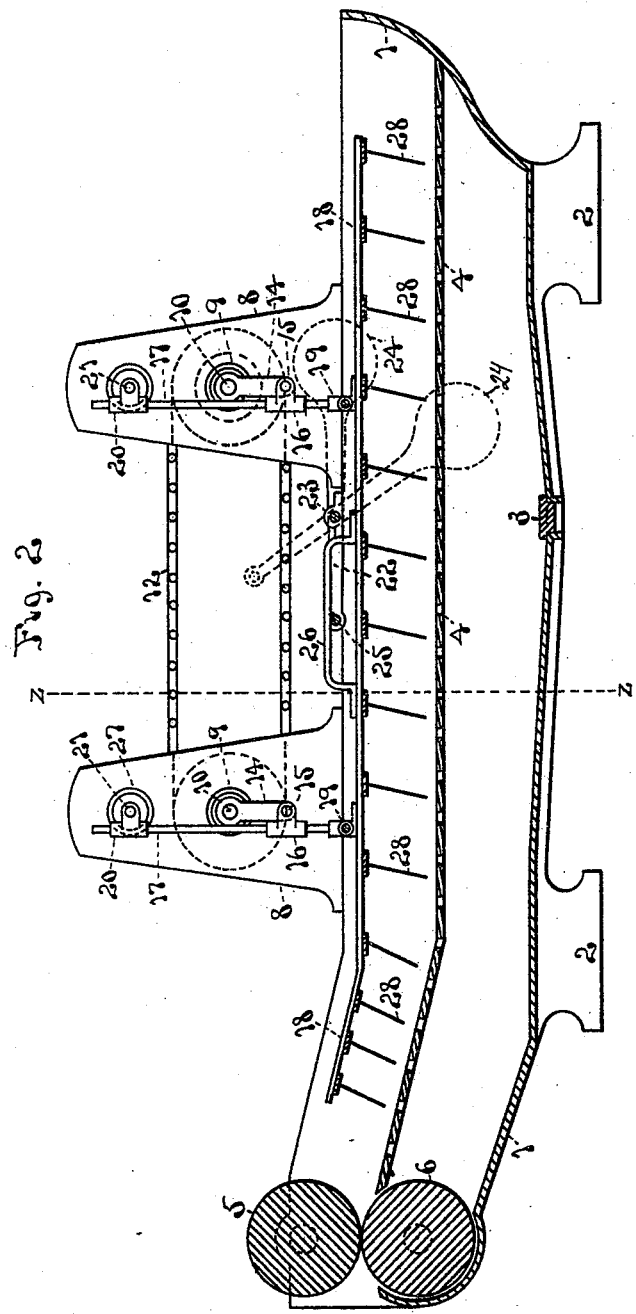
Figure 3:
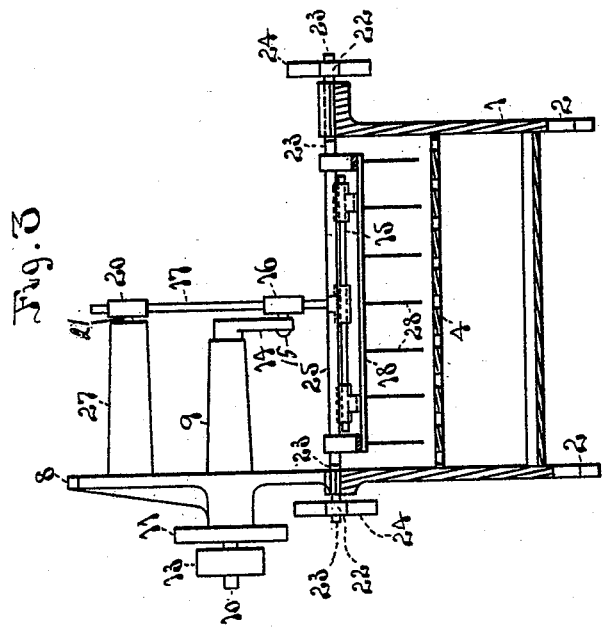

In the drawings:—Figure 1 is a top plan view of a wool washing machine containing our invention. Fig. 2 is a longitudinal vertical section of the same on the dotted line $x$—$x$. Fig. 3 is a transverse section of the same on the dotted line $z$—$z$.

Our invention is an improvement on the counterbalanced rake or harrow shown in the English patent of Holden and Holden, No. 3,509, of September 6, 1876, and in the American patent of C. G. Sargent and F. G. Sargent, No. 184,301, of November 14, 1876, and it consists in providing a simple and easy method of counterbalancing and moving the rake or harrow through the bowl of the machine.

1 is the bowl of the machine, provided with feet 2, 2, on which it is supported, and with a valve, 3, in its bottom to allow the washing fluid to be drawn off when desired. It has the usual perforated false bottom, 4, through which the dirt can fall as it is washed from the wool and settle below it in the usual manner.

5, 6, are the squeeze rolls, the upper one of which is provided with a pulley, 7, to drive it from a suitable countershaft.

On the side of the bowl are attached two uprights, 8, 8, which carry the pipe boxes, 9, 9, projecting out over the center of the bowl. In these boxes the shafts, 10, 10, revolve in suitable bearings. Each shaft has a sprocket gear, 11, on its outer end and these sprocket gears are connected by the chain, 12, so as to revolve in unison with each other. The pulley, 13, on the end of one of the shafts, 10, receives its motion by being belted from any suitable countershaft, and drives both shafts 10.

On the inner ends of the shafts, 10, are attached the cranks, 14, 14, which have their wrist pins, 15, journaled in the sleeves, 16, 16, which are attached firmly to the handles, 17, 17, of the rake or harrow, 18. The handles, 17, are pivoted to the rake by pins, 19, passing through sleeves attached to the top of the rake. The upper ends of the handles, 17, pass through the rocking sleeves, 20, which rock on studs, 21, carried by pipe boxes, 27, projecting from the uprights, 8, and the handles 17 are so made as to slide up and down through these sleeves as the cranks, 14, revolve.

In order to relieve the cranks, 14, of a portion of the strain in driving and lifting the rake, 18, we attach levers, 22, 22, at the sides of the machine on pivot pins, 23, 23, and provide the outer ends of these levers with a weighted or heavy portion, 24. The inner ends of the levers are connected together by a cross bar, 25, which extends across the bowl above the rake and passes under the straps, 26, 26, which are attached to the upper side of the rake and are so arranged that the levers, 22, will be horizontal when the rake is down, and will be raised to the angle shown by dotted lines in Fig. 2, when the rake is up, and the horizontal portions of the straps, 26, allow the rod, 25, to traverse along them as the rake moves up and down and to and fro in a longitudinal direction. The weighted ends of the levers, 22, are so arranged as to substantially balance the weight of the rake and relieve the strain upon the wrist pins, 15, as much as possible. The rake is provided with teeth, 28, corresponding to the shape of the false bottom, 4, sufficiently to move the wool along over the latter and deliver it to the squeeze rolls in the usual way.

If desired, the central part of the rod, 25, might be cut away and its ends left in the form of studs projecting from the levers under the straps, 26, or only one lever might be used having its rod, 25, projecting in the form of a stud under one or both of these straps; the essential feature of the invention being the use of the straps, which allow the rod to move horizontally under them, one or both, so as to accommodate the end of the lever, which lifts the rake, to the different positions which the latter assumes as carried around by the cranks, while counterbalancing it.

What we claim as new, and of our invention, is—

1. In a fiber-washing machine, the combination of the cranks, 14, the handles, 17, attached by pivots to the rake, 18, with the latter, and the counterbalance connected to the rake intermediately between the handles, 17, and arranged to counterbalance the entire rake and to relieve the cranks in lifting the same, substantially as described.

2. The combination of the pivoted weighted levers, 22, the cross rod, 25, connecting the same, the straps 26, attached to the rake, the rake 18, the handles 17, 17, pivoted thereto, and the cranks 14, 14, having their wrist pins connected to the handles, and arranged to carry the same and the rake to and fro and raise and lower the latter as they revolve, substantially as described.

FREDERICK G. SARGENT.
ALLAN C. SARGENT.

Witnesses:
HERBERT V. HILDRETH,
J. B. CARMICHAEL.